(12) United States Patent
Colby

(10) Patent No.: US 9,542,147 B2
(45) Date of Patent: Jan. 10, 2017

(54) PERIPHERAL VISION HOVER DRIFT CUEING

(71) Applicant: Lockheed Martin Corporation, Bethesda, MD (US)

(72) Inventor: Stephen D. Colby, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/107,518

(22) Filed: Dec. 16, 2013

(65) Prior Publication Data

US 2015/0169273 A1    Jun. 18, 2015

(51) Int. Cl.
| | | |
|---|---|---|
| *G06F 7/70* | (2006.01) | |
| *G06F 3/14* | (2006.01) | |
| *B64D 43/00* | (2006.01) | |
| *B63B 49/00* | (2006.01) | |

(52) U.S. Cl.
CPC ............ *G06F 3/14* (2013.01); *B64D 43/00* (2013.01); *B63B 49/00* (2013.01)

(58) Field of Classification Search
USPC .......................................................... 701/14
See application file for complete search history.

(56) References Cited

U.S. PATENT DOCUMENTS

| | | | |
|---|---|---|---|
| 4,348,186 A | 9/1982 | Harvey et al. | |
| 5,296,854 A | 3/1994 | Hamilton et al. | |
| 5,486,821 A | 1/1996 | Stevens et al. | |
| 5,566,073 A | 10/1996 | Margolin | |
| 5,920,321 A * | 7/1999 | Owen et al. | 345/427 |
| 6,285,926 B1 | 9/2001 | Weiler et al. | |
| 6,421,603 B1 * | 7/2002 | Pratt et al. | 701/528 |
| 6,486,799 B1 | 11/2002 | Still et al. | |
| 6,619,220 B1 | 9/2003 | Ducote | |
| 7,010,398 B2 * | 3/2006 | Wilkins et al. | 701/3 |
| 7,091,881 B2 | 8/2006 | Judge et al. | |
| 7,289,906 B2 * | 10/2007 | van der Merwe et al. | 701/472 |
| 7,365,652 B2 * | 4/2008 | Scherbarth | 340/974 |
| 7,603,209 B2 * | 10/2009 | Dwyer et al. | 701/14 |

(Continued)

FOREIGN PATENT DOCUMENTS

EP    0 467 328 A2    7/1991

OTHER PUBLICATIONS

Lif, Patrik et al., "Multimodal Threat Cueing in Simulated Combat Vehicle with Tactile Information Switching between Threat and Waypoint Indication", Swedish Defense Research Agency, Linkoping, Sweden, Human Interface, Part I, HCII, LNCS 6771, 2011, p. 454-461.

(Continued)

*Primary Examiner* — Hussein A. Elchanti
(74) *Attorney, Agent, or Firm* — Miles & Stockbridge P.C.

(57) ABSTRACT

Peripheral vision hover drift cueing methods, systems and computer readable media are disclosed. For example, a system can include one or more sensors, and a peripheral vision hover drift cueing controller coupled to the one or more sensors and configured to determine hover drift and to control a plurality of indicators in response to determined hover drift. The system can also include a first hover drift indicator coupled to the controller and mounted on an inside surface of a vehicle cockpit; and a second hover drift indicator coupled to the controller and mounted on an inside surface of the vehicle cockpit.

20 Claims, 4 Drawing Sheets

(56) References Cited

U.S. PATENT DOCUMENTS

| | | |
|---|---|---|
| 7,961,117 B1 | 6/2011 | Zimmerman et al. |
| 8,089,375 B1 | 1/2012 | Seah |
| 8,099,234 B1 | 1/2012 | Frank et al. |
| 8,120,548 B1 | 2/2012 | Barber |
| 8,416,479 B2 | 4/2013 | Kroll et al. |
| 8,742,952 B1 | 6/2014 | Bold |
| 9,201,567 B2* | 12/2015 | Schrauben ......... G06F 3/04812 |
| 9,366,546 B2 | 6/2016 | Colby |
| 2003/0194683 A1 | 10/2003 | Vorst |
| 2003/0222887 A1 | 12/2003 | Wilkins, Jr. et al. |
| 2004/0217883 A1* | 11/2004 | Judge ................. G01C 23/00 340/946 |
| 2005/0007386 A1 | 1/2005 | Berson et al. |
| 2006/0066459 A1 | 3/2006 | Burch et al. |
| 2006/0235581 A1* | 10/2006 | Petillon ............................ 701/3 |
| 2006/0238377 A1 | 10/2006 | Stiles et al. |
| 2007/0276706 A1* | 11/2007 | Dunsky ............................ 705/5 |
| 2008/0077284 A1 | 3/2008 | Swope |
| 2008/0180351 A1 | 7/2008 | He |
| 2008/0243383 A1 | 10/2008 | Lin |
| 2009/0002220 A1 | 1/2009 | Lovberg et al. |
| 2009/0248224 A1* | 10/2009 | Tschannen ....................... 701/3 |
| 2010/0145610 A1 | 6/2010 | Bacabara et al. |
| 2010/0231705 A1 | 9/2010 | Yahav et al. |
| 2010/0266992 A1 | 10/2010 | Gregoire et al. |
| 2011/0199661 A1 | 8/2011 | Kreitmair-Steck et al. |
| 2012/0099170 A1 | 4/2012 | Shikii et al. |
| 2013/0179010 A1 | 7/2013 | Samuthirapandian et al. |
| 2013/0214998 A1 | 8/2013 | Andes et al. |
| 2013/0226370 A1 | 8/2013 | Muensterer |
| 2014/0002280 A1 | 1/2014 | He |
| 2015/0277561 A1 | 10/2015 | Colby |

OTHER PUBLICATIONS

Cheung, Bob et al., "Using Tactile Cueing to Enhance Spatial Awareness under Degraded Visual Environment", Defense Research & Development Toronto, Canada, RTO-MP-HFM-181, Oct. 2009, pp. P11-1 to P11-10.
McGrath, Braden J., "Tactile Instument for Aviation", Naval Aerospace Medical Research laboratory, Pensacola, Florida, Jul. 30, 2000, 94 pages.
"Annex B—In-Flight Studies With Tactile Displays", NATO, RTO-TR-HFM-162, Mar. 12, 2012. pp. B-1 to B-10.
Final Rejection dated Nov. 17, 2015, in U.S. Appl. No. 14/187,533.
International Search Report and Written Opinion in PCT/US2014/070446 dated Aug. 19, 2015.
Nonfinal Rejection dated Aug. 20, 2015, in U.S. Appl. No. 14/187,533.
International Search Report and Written Opinon in PCT/US15/21960 dated Dec. 10, 2015.
International Search Report and Written Opinion in PCT/US15/16777 dated Dec. 8, 2015.
Notice of Allowance dated Apr. 1, 2016, in U.S. Appl. No. 14/225,784.
Notice of Allowance dated Feb. 16, 2016, in U.S. Appl. No. 14/187,533.
International Preliminary Report on Patentability in PCT/US2015/016777 dated Sep. 9, 2016.

* cited by examiner

PERIPHERAL VISION HOVER DRIFT CUEING

Some implementations relate generally to avionics and, more particularly, to methods, systems and computer readable media for peripheral vision hover drift cueing.

Rotary wing aircraft (and tilt rotor aircraft such as the V-22 Osprey) are routinely required to approach and land at sites without navigation guidance and/or in limited visibility conditions. Often the topography, ground hazards, obstacles and weather in the area are unknown or changing. Upon arrival at a landing or hover site, the pilot typically makes critical judgments based on incomplete or inaccurate data in order to determine the proper procedure to approach and land. If the terrain condition is such that dust, snow, sand, or the like will be stirred by rotor downwash, the aircraft may become engulfed in a cloud of visually-restrictive material. This is commonly referred to as a degraded visual environment (DVE) or a "brownout/whiteout" situation.

Spatial disorientation in a DVE is a common cause of incidents according to some literature reviews, pilot interviews, and military incident reports. During approach to hover and landing, the pilot may manipulate the aircraft controls to conduct a constant deceleration of longitudinal velocity while coordinating a rate of descent to the ground (or hover point) in such a way as to arrive with little or no forward velocity and a low rate of descent. In addition to controlling a rate of descent, the pilot must also typically compensate for forward, aft, lateral, and heading drift.

In a DVE, such as instrument meteorological conditions (IMC) or brownout/whiteout situations, a pilot may be denied both his peripheral vision cues and relative speed and drift sensations provided by his/her subconscious vision channels. Some conventional instrument flight displays may require a pilot to use the central portion of his/her visual known as the fovea centralis. The fovea centralis occupies a small portion of the central field of view (e.g., 1% of the visual area of the retina), but may use 50% of the visual cortex in the brain. Thus, by presenting critical hover drift information to this area of a pilot's visual field, a mental processing bandwidth constraint is created in highly task loaded environments. Some implementations were conceived in light of the above-mentioned problems and limitations, among other things.

Some implementations can include a system comprising one or more sensors and a peripheral vision hover drift cueing controller coupled to the one or more sensors and configured to determine hover drift and to control a plurality of indicators in response to determined hover drift. The system can also include a first hover drift indicator coupled to the controller and mounted on an inside surface of an aircraft cockpit and a second hover drift indicator coupled to the controller and mounted on an inside surface of the aircraft cockpit.

The sensors/information sources can include one or more of a radar altimeter, an air data system, an inertial navigation system, a traffic alert and collision avoidance system, an Enhanced Ground Proximity Warning System (EGPWS)/Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera.

The system can include a third hover drift indicator coupled to the controller. The first hover drift indicator can be configured to indicate fore/aft drift. The second hover drift indicator can be configured to indicate lateral drift. The first hover drift indicator can be mounted on a door frame of the aircraft adjacent a pilot's seat so as to be visible in a peripheral vision field of the pilot. The second hover drift indicator can be mounted adjacent to a central instrument panel of the aircraft so as to be visible in a peripheral vision field of the pilot.

Some implementations can include a method. The method can include receiving, at a processor, aircraft position information from one or more sensors disposed on the aircraft. The method can also include determining, at the processor, hover drift based on the received aircraft position information. The method can further include controlling, with the processor, one or more peripheral vision hover drift indicators based on the determined hover drift.

The one or more sensors can include one or more of a radar altimeter, an air data system, an inertial navigation system, a traffic alert and collision avoidance system, an Enhanced Ground Proximity Warning System (EGPWS)/Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera.

The one or more peripheral vision hover drift indicators can include a first hover drift indicator and a second hover drift indicator. The one or more peripheral vision hover drift indicators can further comprise a third hover drift indicator coupled to the processor.

The first hover drift indicator can be configured to indicate fore/aft drift. The second hover drift indicator can be configured to indicate lateral drift. The first hover drift indicator can be mounted on a door frame of the aircraft adjacent a pilot's seat so as to be visible in a peripheral vision field of the pilot. The second hover drift indicator can be mounted adjacent to a central instrument panel of the aircraft so as to be visible in a peripheral vision field of the pilot.

Some implementations can include a nontransitory computer readable medium having stored thereon software instructions that, when executed, cause a processor to perform operations. The operations can include receiving, at a processor, aircraft position information from one or more sensors disposed on the aircraft. The operations can also include determining, at the processor, hover drift based on the received aircraft position information. The operations can further include controlling, with the processor, one or more peripheral vision hover drift indicators based on the determined hover drift.

The one or more sensors can include one or more of a radar altimeter, an air data system, an inertial navigation system, a traffic alert and collision avoidance system, an Enhanced Ground Proximity Warning System (EGPWS)/Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera.

The one or more peripheral vision hover drift indicators can include a first hover drift indicator and a second hover drift indicator. The first hover drift indicator can be configured to indicate fore/aft drift and can be mounted on a door frame of the aircraft adjacent a pilot's seat so as to be visible in a peripheral vision field of the pilot. The second hover drift indicator can be configured to indicate lateral drift and can be mounted adjacent to a central instrument panel of the aircraft so as to be visible in a peripheral vision field of the pilot.

DETAILED DESCRIPTION

Figure 1:
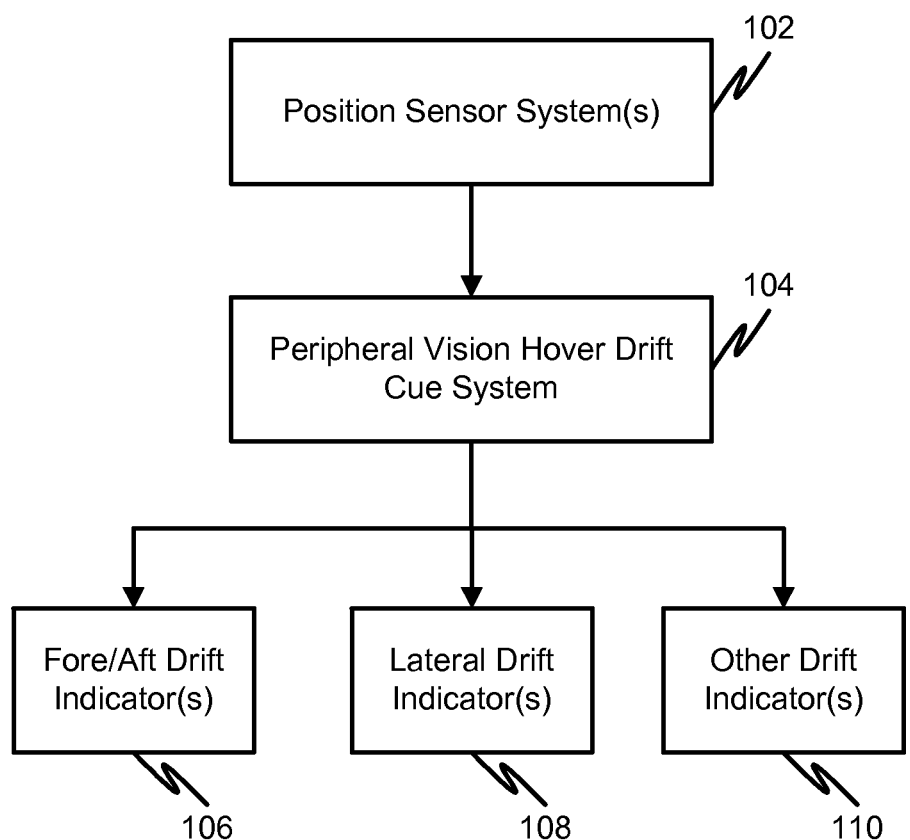
FIG. 1 shows a diagram of an example peripheral vision hover drift cueing system in accordance with some implementations.

FIG. 1 shows a diagram of an example peripheral vision hover drift cueing system in accordance with some implementations. The system 100 includes one or more position information systems 102, a peripheral vision hover drift cueing system 104 (or controller), one or more fore/aft drift indicators 106, one or more lateral drift indicators 108 and, optionally, one or more other drift indicators 110 for a parameter such as heading, altitude or the like.

In operation, the position sensor systems 102 generate position information, which is transmitted to the peripheral vision hover drift cueing system 104. The sensor systems 102 can include, for example, one or more of a radar altimeter, an air data system, an inertial navigation system, a traffic alert and collision avoidance system, an Enhanced Ground Proximity Warning System (EGPWS)/Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera. In addition to the above-mentioned example sensors, traditional avionics instruments (altimeter, vertical speed indicator, compass, air speed indicator or the like) could also be included in the sensor system 102.

The peripheral vision hover drift cueing system 104 uses the received position information to determine if the aircraft is drifting from hover. For example, the peripheral vision hover drift cueing system 104 can compare the position information received over time to determine if the aircraft is drifting in hover. Drifting from hover can occur in one or more directions and/or axes such as fore/aft, lateral, heading, altitude, yaw, pitch and/or roll.

If the peripheral vision hover drift cueing system 104 determines drift is occurring, the peripheral vision hover drift cueing system 104 can cause a signal to be sent to one or more peripheral vision indicators, such as the fore/aft drift indicator(s) 106, the lateral drift indicators 108 and/or the other drift indicator(s) 110.

The drift indicators (e.g., 106-110) can include one or more light emitting diodes (LEDs). In order to provide a peripheral vision cue, the indicator can cause the LEDs to appear to be moving (e.g., in a direction of the drift). For example, if the aircraft is drifting in an aft direction, the fore/aft indicator can be used to show this drift by causing the LEDs to appear to move in a direction that would suggest aft movement in the pilot's peripheral vision.

Figure 3:
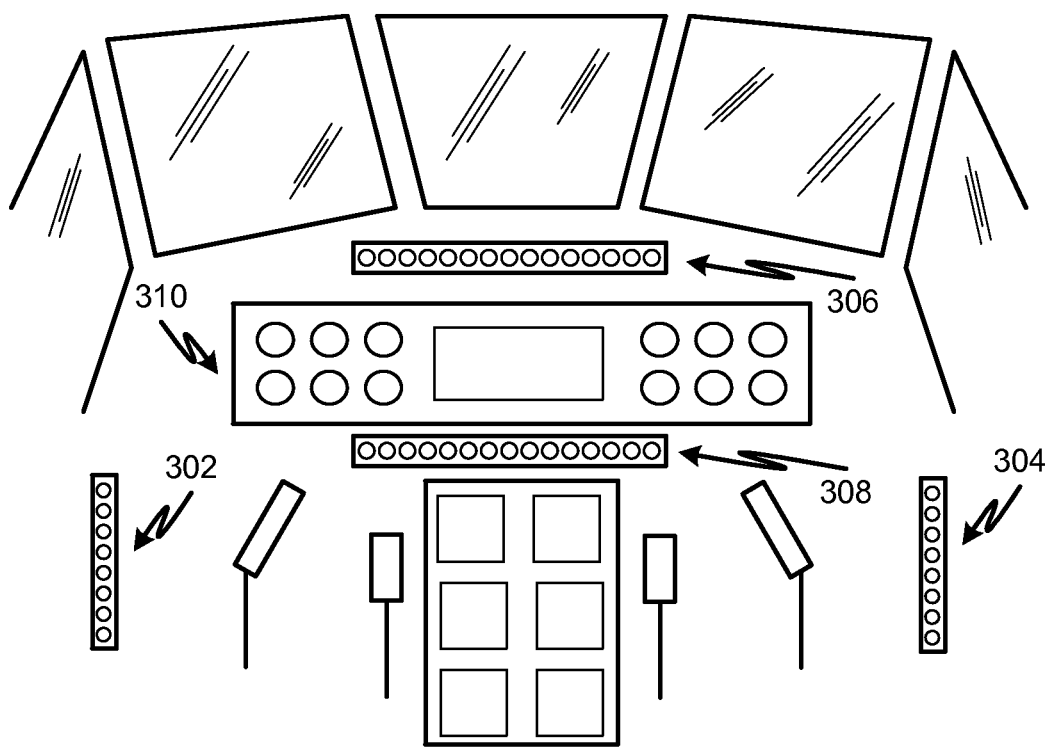
FIG. 3 is a diagram of an example aircraft cockpit having a peripheral vision hover drift cueing system in accordance with some implementations.

The indicators can be placed within the cockpit in locations for viewing by the pilot's peripheral vision. For example, the lateral drift indicator can be placed above or below the main instrument panel. The fore/aft indicator can be placed on a door or doorframe of the aircraft to an outside side of a pilot's seat. An example placement of peripheral vision hover drift cueing indicators is shown in FIG. 3 and described below. In addition to, or as an alternative to, using apparent motion, the indicators can use color change, brightness change, flashing or the like to indicate drift and/or amount or rate of drift.

Figure 2:
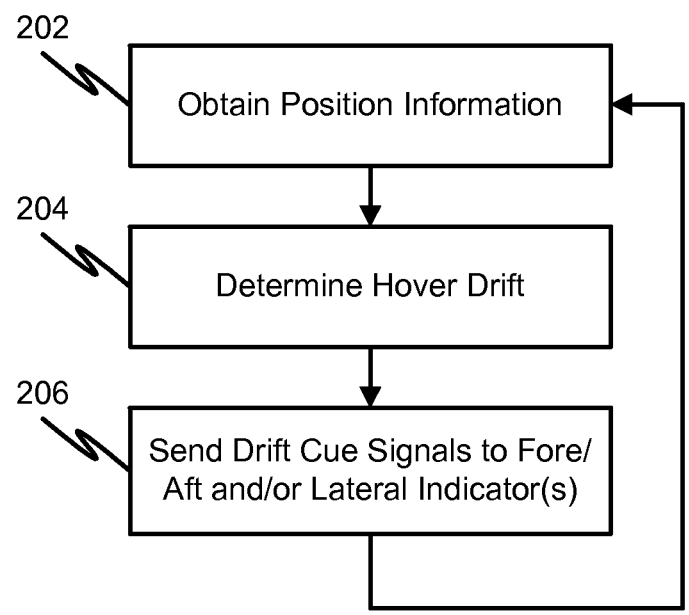
FIG. 2 shows a flow chart of an example method for peripheral vision hover drift cueing in accordance with some implementations.

FIG. 2 shows a flow chart of an example method for peripheral vision hover drift cueing in accordance with some implementations. Processing begins at 202, where position (or other) information is obtained. For example, position information from one or more sensors (e.g., 102) can be obtained by a peripheral vision hover drift cueing system (e.g., 104). The information can include flight information such as velocity, height above ground, groundspeed, ground track, wind direction, wind speed, location of a landing/hover zone, location of other aircraft, aircraft performance, or the like. Processing continues to 204.

At 204, the system determines if hover drift is occurring. For example, the system can compare current position information with previous position information. Processing continues to 206.

At 206, the system sends a signal to each indicator (e.g., 106-110) according to the determined amount of drift. It will be appreciated that 202-206 can be repeated in whole or in part in order to accomplish a contemplated peripheral vision hover drift cueing task.

FIG. 3 is a diagram of an example aircraft cockpit 300 having a peripheral vision hover drift cueing system in accordance with some implementations. In particular, the cockpit 300 includes a first fore/aft drift indicator 302 disposed on the port side door of the aircraft, a second fore/aft drift indicator 304 disposed on the starboard side door of the aircraft, a lateral drift indicator (306 or 308) disposed above or below the instrument panel 310.

In operation, the indicators (302-308) can be controlled by a peripheral vision hover drift cueing system (e.g., 104) in accordance with a method or process for peripheral vision hover drift cueing (e.g., 202-206).

Figure 4:
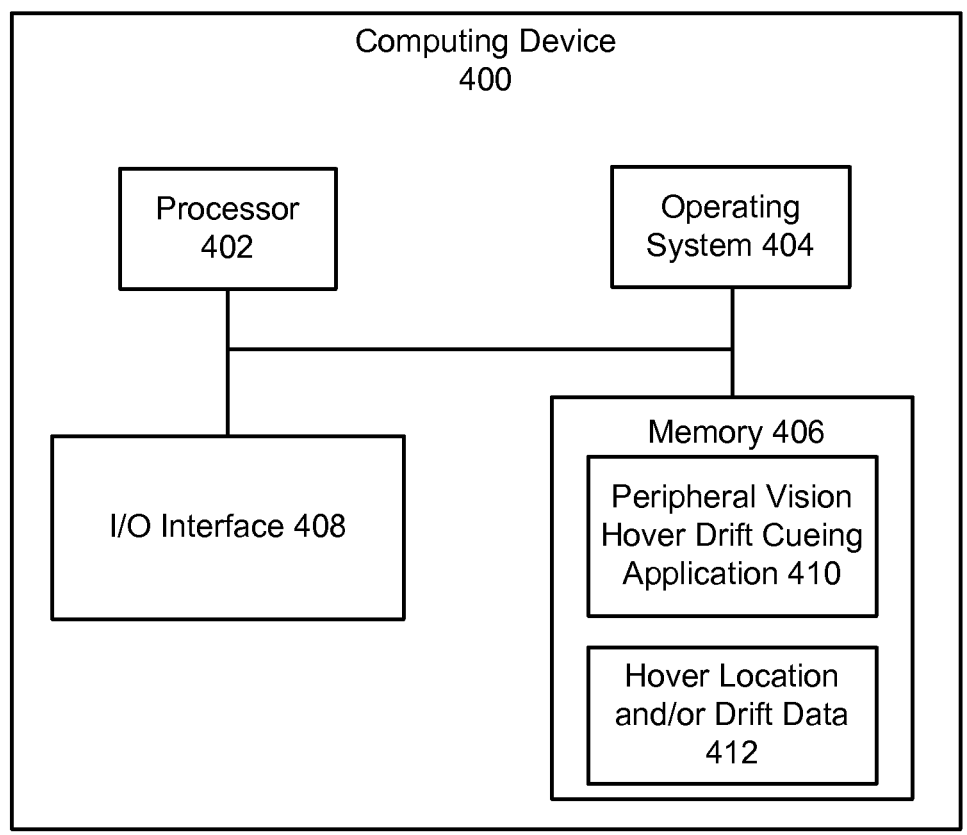
FIG. 4 is a diagram of an example computing system for peripheral vision hover drift cueing in accordance with some implementations.

FIG. 4 is a diagram of an example computing device for peripheral vision hover drift cueing in accordance with some implementations. The computing device 400 includes a processor 402, an operating system 404, a memory 406 and an I/O interface 408. The memory 406 can store a peripheral vision hover drift cueing application 410 and hover location, position and/or drift data 412.

In operation, the processor 402 may execute the peripheral vision hover drift cueing application 410 stored in the memory 406. The peripheral vision hover drift cueing application 410 can include software instructions that, when executed by the processor 402, cause the processor 402 to perform operations for peripheral vision hover drift cueing in accordance with the present disclosure (e.g., the peripheral vision hover drift cueing application 410 can cause the processor to perform one or more of steps 202-206 described above and, in conjunction, can access the hover location, aircraft position and/or drift data 412). The peripheral vision hover drift cueing application 410 can also operate in conjunction with the operating system 404.

The computer (e.g., 400) can include, but is not limited to, a single processor system, a multi-processor system (co-located or distributed), a cloud computing system, or a combination of the above.

A network can connect the sensors, the peripheral vision hover drift cueing system and the indicators. The network can be a wired or wireless network, and can include, but is not limited to, an aircraft signal bus, a WiFi network, a local area network, a wide area network, the Internet, or a combination of the above.

The data storage, memory and/or nontransitory computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or nontransitory computer readable media having stored instructions for performing one or more peripheral vision hover drift cueing tasks as described herein). The stored software instructions can be executed on a programmed general purpose computer, a special purpose computer, a microprocessor, or the like.

The computing device 400 can be a standalone computing device or a device incorporated in another system, such as an avionics system or flight computer.

It is, therefore, apparent that there is provided, in accordance with the various implementations disclosed herein, methods, systems and computer readable media for peripheral vision hover drift cueing.

While the invention has been described in various embodiments where the vehicle is an aircraft, the invention is also contemplated for use in alternative vehicles. For example, the vehicle may be a rotary wing aircraft, a fixed wing aircraft, a vertical take off aircraft, or a ground vehicle. The vehicle may alternatively be a watercraft such as, for example, a surface ship, a submarine, or a hovercraft.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A system comprising:
one or more sensors;
a peripheral vision hover drift cueing controller coupled to the one or more sensors and configured to determine hover drift and to control a plurality of indicators in response to determined hover drift; and
two or more hover drift indicators coupled to the controller and mounted on an inside surface of a vehicle's cockpit in a peripheral vision area of a pilot with respect to a central instrument panel of the vehicle being in a central vision area of the pilot,
the two or more hover drift indicators being separate from each other and the central instrument panel;
wherein the two or more hover drift indicators each include a plurality of light emitting diodes, and
the plurality of light emitting diodes indicate the hover drift by emitting light so as to appear to move in a direction of the hover drift.

2. The system of claim 1, wherein the sensors include one or more of a radar altimeter, an air data system, an inertial navigation system, a traffic alert and collision avoidance system, an Enhanced Ground Proximity Warning System (EGPWS)/Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera.

3. The system of claim 1, the two or more hover drift indicators comprising a first hover drift indicator and a second hover drift indicator.

4. The system of claim 3, wherein the first hover drift indicator is configured to indicate fore/aft drift and the second hover drift indicator is configured to indicate lateral drift.

5. The system of claim 1, wherein the vehicle is an aircraft.

6. The system of claim 5, wherein the vehicle is a helicopter.

7. The system of claim 1, wherein the vehicle is a watercraft.

8. The system of claim 4, wherein the first hover drift indicator is mounted on a door frame of the vehicle adjacent a seat of the pilot so as to be visible in the peripheral vision area of the pilot and the second hover drift indicator is mounted adjacent to a central instrument panel of the vehicle so as to be visible in the peripheral vision area of the pilot.

9. A method comprising:
receiving, at a processor, vehicle position information from one or more sensors disposed on a vehicle;
determining, at the processor, hover drift based on the received vehicle position information; and
controlling, with the processor, two or more peripheral vision hover drift indicators based on the determined hover drift, the two or more hover drift indicators being mounted on an inside surface of a cockpit of the vehicle in a peripheral vision area of a pilot with respect to a central instrument panel of the vehicle being in a central vision area of the pilot, the two or more hover drift indicators being separate from each other and the central instrument panel;
wherein the two or more hover drift indicators each include a plurality of light emitting diodes, and
indicating the hover drift by using the plurality of light emitting diodes to emit light so as to appear to move in a direction of the hover drift.

10. The method of claim 9, wherein the two or more peripheral vision hover drift indicators includes a first hover drift indicator and a second hover drift indicator.

11. The method of claim 9, wherein the vehicle is a watercraft.

12. The method of claim 9, wherein the vehicle is an aircraft.

13. The method of claim 10, wherein the first hover drift indicator is configured to indicate fore/aft drift and the second hover drift indicator is configured to indicate lateral drift.

14. The method of claim 13, wherein the first hover drift indicator is mounted on a door frame of the vehicle adjacent a seat of the pilot so as to be visible in the peripheral vision area of the pilot.

15. The method of claim 13, wherein the second hover drift indicator is mounted adjacent to a central instrument panel of the vehicle so as to be visible in the peripheral vision area of the pilot.

16. A nontransitory computer readable medium having stored thereon software instructions that, when executed, cause a processor to perform operations including:
receiving, at a processor, vehicle position information from one or more sensors disposed on a vehicle;
determining, at the processor, hover drift based on the received vehicle position information; and controlling, with the processor, two or more peripheral vision hover drift indicators based on the determined hover drift, the two or more hover drift indicators being mounted on an inside surface of a cockpit of the vehicle in a peripheral vision area of a pilot with respect to a central instrument panel of the vehicle being in a central vision area of the pilot, the two or more hover drift indicators being separate from each other and the central instrument panel;

wherein the two or more hover drift indicators each include a plurality of light emitting diodes, and indicating the hover drift by using the plurality of light emitting diodes to emit light so as to appear to move in a direction of the hover drift.

17. The nontransitory computer readable medium of claim 16, wherein the one or more sensors include one or more of a radar altimeter, an air data system, an inertial navigation system, a traffic alert and collision avoidance system, an Enhanced Ground Proximity Warning System (EGPWS)/Controlled Flight Into Terrain (CFIT) system, a digital map, a terrain database, a Global Positioning System (GPS) receiver, a Differential Global Positioning System (DGPS) receiver, a microwave radar, a forward looking infrared (FLIR) camera, and/or a video camera.

18. The nontransitory computer readable medium of claim 16, wherein the two or more peripheral vision hover drift indicators includes a first hover drift indicator and a second hover drift indicator.

19. The nontransitory computer readable medium of claim 18, wherein the first hover drift indicator is configured to indicate fore/aft drift and is mounted on a door frame of the vehicle adjacent a seat of the pilot so as to be visible in the peripheral vision area of the pilot.

20. The nontransitory computer readable medium of claim 18, wherein the second hover drift indicator is configured to indicate lateral drift and is mounted adjacent to the central instrument panel of the vehicle so as to be visible in the peripheral vision area of the pilot.

* * * * *

UNITED STATES PATENT AND TRADEMARK OFFICE
CERTIFICATE OF CORRECTION

PATENT NO. : 9,542,147 B2  Page 1 of 1
APPLICATION NO. : 14/107518
DATED : January 10, 2017
INVENTOR(S) : Stephen D. Colby It is certified that error appears in the above-identified patent and that said Letters Patent is hereby corrected as shown below:

On the Title Page

In Item (72), the inventor's name should read -- Steven D. Colby, Owego, NY --.

Signed and Sealed this
Twentieth Day of June, 2017

Joseph Matal
*Performing the Functions and Duties of the
Under Secretary of Commerce for Intellectual Property and
Director of the United States Patent and Trademark Office*